(12) United States Patent
Ozawa et al.

(10) Patent No.: US 8,119,222 B2
(45) Date of Patent: Feb. 21, 2012

(54) PRE-COATED METAL SHEET FOR SLOT-IN DRIVE CASES

(75) Inventors: Takehiro Ozawa, Tokyo (JP); Masatsugu Saito, Tokyo (JP)

(73) Assignee: Furukawa-sky Aluminum Corp., Tokyo (JP)

( * ) Notice: Subject to any disclaimer, the term of this patent is extended or adjusted under 35 U.S.C. 154(b) by 1331 days.

(21) Appl. No.: 11/602,512

(22) Filed: Nov. 20, 2006

(65) Prior Publication Data

US 2007/0128431 A1 Jun. 7, 2007

(30) Foreign Application Priority Data

Nov. 22, 2005 (JP) .................................. 2005-337490
Nov. 13, 2006 (JP) .................................. 2006-306221

(51) Int. Cl.
| B32B 15/08 | (2006.01) |
| B32B 15/082 | (2006.01) |
| B32B 15/09 | (2006.01) |
| B32B 15/092 | (2006.01) |
| B32B 27/00 | (2006.01) |
| B32B 27/30 | (2006.01) |
| B32B 27/36 | (2006.01) |
| B32B 27/38 | (2006.01) |
| D06N 7/04 | (2006.01) |
| D06N 7/00 | (2006.01) |
| G11B 5/62 | (2006.01) |
| G11B 17/00 | (2006.01) |

(52) U.S. Cl. ........ 428/143; 428/147; 428/336; 428/339; 428/418; 428/425.8; 428/457; 428/323; 369/244.1; 720/671

(58) Field of Classification Search .................. 720/671, 720/648; 369/112.23, 75.1, 75.2, 77.1, 77.2, 369/244, 30; 359/871; 428/626, 339, 457, 428/458, 418, 423.7, 461, 323, 328, 332, 428/143, 147

See application file for complete search history.

(56) References Cited

U.S. PATENT DOCUMENTS 5,993,975 A * 11/1999 Tanaka et al. ................. 428/458

(Continued)

FOREIGN PATENT DOCUMENTS

| JP | 06240469 A | * | 8/1994 |
| JP | 08-267656 |   | 10/1996 |
| JP | 08267662 A | * | 10/1996 |

(Continued)

OTHER PUBLICATIONS

English translation of Tosaka et al. (JP 06240469 A).*

(Continued)

Primary Examiner — David Sample
Assistant Examiner — Nancy Rosenberg
(74) Attorney, Agent, or Firm — Carrier Blackman & Associates, P.C.; Joseph P. Carrier; William D. Blackman (57) ABSTRACT

A pre-coated metal sheet for slot-in drive cases which has a metal sheet; chemical conversion coatings formed on both sides of the metal sheet; and a coating film formed on one of the chemical conversion coatings and containing at least one base resin selected from a polyester-series resin, an epoxy-series resin and an acrylic-series resin, at least one resin beads selected from nylon-series resin beads, fluorine-series resin beads and urethane-series resin beads, and at least one lubricant a3 selected from carnauba wax, polyethylene wax and microcrystalline wax. The coating film has a surface having an arithmetical mean deviation of the assessed profile Ra of 0.3 to 4.5 μm and a mean width of the profile elements, RSm, of 105 to 280 μm, and the ratio of mean particle diameter of the resin beads to coating film layer thickness of the coating film is in the range of 2.0 to 3.0.

14 Claims, 1 Drawing Sheet

U.S. PATENT DOCUMENTS

| | | | |
|---|---|---|---|
| 6,086,992 | A | 7/2000 | Kato et al. |
| 6,670,031 | B1 | 12/2003 | Ohta et al. |
| 6,709,143 | B2 * | 3/2004 | Harada et al. ............. 362/558 |
| 6,797,407 | B2 | 9/2004 | Kato |
| 6,857,125 | B2 | 2/2005 | Makino et al. |
| 2003/0107973 | A1 * | 6/2003 | Makino et al. ............. 369/75.2 |
| 2003/0234460 | A1 * | 12/2003 | Hayashi et al. ............. 264/2.7 |
| 2004/0071959 | A1 * | 4/2004 | Ohta et al. ............. 428/328 |
| 2005/0181146 | A1 * | 8/2005 | Yoneyama et al. ............. 428/1.31 |

FOREIGN PATENT DOCUMENTS

| | | | | |
|---|---|---|---|---|
| JP | 2001-029885 | | 2/2001 | |
| JP | 2001-335738 | | 12/2001 | |
| JP | 2003-242703 | | 8/2003 | |
| JP | 2004-098624 | | 4/2004 | |
| JP | 2005-074963 | | 3/2005 | |
| JP | 2005074963 | A * | 3/2005 | |
| JP | 2005-267806 | | 9/2005 | |
| JP | 2005275395 | A * | 10/2005 | |
| JP | 2005-305993 | | 11/2005 | |

OTHER PUBLICATIONS

English translation of Usami et al. (JP 2005074963 A).*
English translation of Yoshida et al. (JP 08267662 A).*
English translation of Fujiwara (JP 2005275395 A).*
English translation of JP2005074963 abstract only, Mar. 24, 2005.*

* cited by examiner

PRE-COATED METAL SHEET FOR SLOT-IN DRIVE CASES

BACKGROUND OF THE INVENTION

1. Field of the Invention

This invention relates to a pre-coated metal sheet used for slot-in drive cases in housings of electric equipment and electronic equipment such as liquid-crystal television sets, personal computers and DVD players. In the present invention, the term "pre-coated" is used to mean "coated in advance of press molding".

2. Description of Related Art

In recent years, development of housings of electric equipment and electronic equipment and development of optical disks such as CDs and DVDs (digital video disks) have been put forward, and slot-in drive cases have begun to become popular which have enabled drive cases to be more space-saving. Such a slot-in system is one having the function that an optical disk is automatically drawn into the drive case by just placing the disk into a slot as the disk stands bare, where the optical disk can more smoothly be taken in and out than the conventional tray system. Recently, pre-coated metal sheets are being employed in such slot-in drive cases. For example, a pre-coated steel sheet is employed which is used to form the drive case and has, on its inner surface, a thin coating of 1 μm or less in thickness which has a good sliding property. Because of its superior sliding property, it is advantageous in that, when the optical disk is slotted in, the edge face of the optical disk comes into contact with the coating film surface at so small resistance as to make a small rubbing noise. However, very small foreign matter stands mixed in the thin coating and there are coating defects usually not coming into question. Hence, the optical disk may be scratched when the optical disk comes into contact with the coating film formed on the inner surface of the drive case. Accordingly, depending on what structure the drive case has, such a pre-coated steel sheet has in some cases been kept from being employed.

The slot-in drive case has a structure that the optical disk tends to be scratched. The space between the optical disk and the inner surface of the drive case is so narrow that it may come about that the optical disk strikes against the inner surface of the drive case in relation to the thickness precision of the optical disk itself and any deflection of the optical disk at the time of its driving. It may also come about that the optical disk comes into contact with the inner surface of the drive case when any accidental impact is applied to the drive during reproduction from the optical disk or during recording on the same. It may further come about that, depending on how the optical disk is placed in, it is slotted into the drive case in the state the optical disk is inclined, so that the optical disk may come into contact with the inner surface of the drive case. The inner surface of the drive case may have various structure, where, of the inner surface of the drive case, the part with which the optical disk has a possibility of coming into contact is a plane surface, and hence the both come into face to-face contact.

Various kinds of optical disks have been developed. Some of them may adversely affect the reproduction and writing of records just when the surface of the optical disk is slightly scratched. Thus, there has been a disadvantage that the optical disk comes not usable if the optical disk is scratched as a result of the contact of the optical disk with the inner surface of the drive case.

In order to prevent the optical disk from coming scratched, it is proposed, as disclosed in Japanese Patent Application Laid-open No. 2003-242703 (Patent Document 1), that a scratch-preventive coating composed basically of a urethane resin and containing at least polyurethane particles and a fluorine resin powder is formed on the surface of any member with which the optical disk has a possibility of coming into contact in an optical-disk unit, to prevent the optical disk from being scratched.

However, the scratch-preventive coating disclosed in Patent Document 1 is a post-coating formed partially by coating carried out after press molding. Such a post-coating must be formed by coating carried out in a stated layer thickness, partially or on the whole for each press-molded product. Hence, there remains a problem that such coating requires so complicated process as to result in a low productivity and make an increase in production cost unavoidable.

Meanwhile, it is difficult for the reason stated below, that the coating material disclosed in Patent Document 1 is diverted to a coating material for pre-coating.

In the scratch-preventive coating disclosed in Patent Document 1, the urethane resin, which has a rich flexibility, is used as a base resin, and hence the coating formed may deform when the optical disk comes into contact with the scratch-preventive coating, so that the area of contact between the coating and the optical disk comes larger than cases in which other resins are used. Such an increase in contact area damages scratch-preventive properties. Accordingly, the polyurethane particles are incorporated in the coating in an amount of as large as from 20 to 150 parts by weight based on 100 parts by weight of the base resin, so as to make the contact area smaller. In the coating containing the polyurethane particles in such a large quantity, the polyurethane particles tend to come off the coating, so that the effect of preventing scratch that is to be brought by the addition of the polyurethane particles may insufficiently be brought out. There has been such a problem In addition, in what is disclosed in Patent Document 1, the low frictional, fluorine resin powder must be incorporated in the coating as a large component which is in an amount of from 10 to 150 parts by weight based on 100 parts by weight of the base resin. Since such a coating contains the fluorine resin powder in a large quantity, there have been problems that not only an increase in material cost is unavoidable but also it is difficult to wind up the product sheet when it is coiled up.

Moreover, in the coating film disclosed in Patent Document 1, the fluorine resin powder is not liquefied at the temperature where the coating film is baked (temperature: 80° C. to 140° C.) and is kept in the state of softened powder. Hence, any sufficient properties of penetration into the base resin are not obtainable to tend to cause dispersion non-uniformity locally, so that the sliding property may come non-uniform. There has been such a problem as well.

A pre-coated aluminum alloy sheet is also proposed which is a pre-coated aluminum alloy sheet used for drive cases of electronic equipment such as personal computers, and aims to prevent the drive case itself from being scratched at the time of press molding and because of its contact with other component parts (Japanese Patent Application Laid-open No. 2004-98624). Its coating film contains a base resin such as polyester-series resin, beads of an acrylic-series resin or the like, and an inner wax such as polyethylene wax. However, this coating film is what is considered to prevent itself from being scratched, and is not what prevents the other member optical disk from being scratched. More specifically, in this coating film, the beads are added to the base resin to make the coating film strong and further the inner wax is added to provide the coating film with lubricity, and hence this coating film takes it as a basic idea to make itself not easily scratched at the time of press molding. Thus, this coating film takes it into consideration to chiefly satisfy the performance required on the outer-surface side of the drive case, and does not take it into consideration to satisfy the performance required on the inner-surface side of the drive case as in the present invention, i.e., to prevent the other member optical disk from being scratched. The present inventors have evaluated disk scratch-preventive properties in respect of a coating film in which acrylic resin beads and carnauba wax have been added to the polyester resin. As the result, they have confirmed that the optical disk is seriously scratched.

SUMMARY OF THE INVENTION

An object of the present invention is to provide a pre-coated metal sheet which is a pre-coated metal sheet prevailingly used for slot-in drive cases of electric equipment and electronic equipment, and which has superior scratch-preventive properties to optical disks, also makes only a small rubbing noise, and promises a good wind-up performance when it is coiled up, an improved productivity and a low production cost.

The present invention is a pre-coated metal sheet for slot-in drive cases which comprises: a metal sheet; chemical conversion coatings formed on both sides of the metal sheet; and a coating film A which is a coating film formed on one of the chemical conversion coatings, and contains at least one base resin a1 selected from the group consisting of a polyester-series resin, an epoxy-series resin and an acrylic-series resin, at least one resin beads a2 selected from the group consisting of nylon-series resin beads, fluorine-series resin beads and urethane-series resin beads, and at least one lubricant a3 selected from the group consisting of carnauba wax, polyethylene wax and microcrystalline wax; the coating film A having a surface which has an arithemetical mean deviation of the assessed profile that can be an arithemetic mean roughness Ra of from 0.3 to 4.5 μm and a mean width of the profile elements that can be a mean length of profile elements, RSm, of from 105 to 280 μm, and the ratio of mean particle diameter of the resin beads a2 to coating film layer thickness of the coating film A being in the range of from 2.0 to 3.0.

In a preferred embodiment of the present invention, the resin beads a2 are the nylon-series resin beads, and the coating film A has a surface which has an arithmetical mean deviation of the assessed profile Ra of from 3.0 to 4.5 μm and a mean width of the profile elements, RSm, of from 200 to 280 μm.

In another preferred embodiment of the present invention, the resin beads a2 are the fluorine-series resin beads, and the coating film A has a surface which has an arithmetical mean deviation of the assessed profile Ra of from 0.3 to 0.6 μm and a mean width of the profile elements, RSm, of from 200 to 220 μm.

In still another preferred embodiment of the present invention, the resin beads a2 are the urethane-series resin beads, and the coating film A has a surface which has an arithmetical mean deviation of the assessed profile Ra of from 1.0 to 2.5 μm and a mean width of the profile elements, RSm, of from 105 to 250 μm.

In a preferred embodiment for the urethane resin beads of the present invention, Ra and RSm satisfy the relation of:

$$200 \leq RSm + 73 \times Ra \leq 350.$$

In a further preferred embodiment of the present invention, 4 or less agglomerates composed of 35 or more resin beads a2 are present in the coating film A per 1 mm$^2$ of its surface, and the coating film A has a coefficient of dynamic friction of 0.15 or less at its surface.

In a still further preferred embodiment of the present invention, the pre-coated metal sheet further comprises a conductive resin coating B which is a resin coating formed on the other of the chemical conversion coatings and contains at least one base resin b1 selected from the group consisting of a polyester-series resin, an epoxy-series resin and an acrylic-series resin, a nickel filler b2 composed of a scaly nickel filler and a chainlike nickel filler, and at least one lubricant b3 selected from the group consisting of polyethylene wax, carnauba wax and microcrystalline wax; the filler b2 being in a content of from 10 to 70% by weight based on the solid content of the base resin b1, and the lubricant b3 being in a content of from 1 to 5% by weight based on the resin solid content; and the conductive resin coating B having a thickness of from 0.2 to 2.0 μm.

In a still further preferred embodiment of the present invention, the pre-coated metal sheet further comprises, in place of the conductive resin coating B, a heat radiating and electrically conductive resin coating C which is a resin coating formed on the other of the chemical conversion coatings and contains at least one base resin c1 selected from the group consisting of a fluorine-series resin, an epoxy-series resin, a polyester-series resin, an acrylic-series resin and a urethane-series resin, a heat radiating material c2 containing at least graphite, and a conducting material c3 containing at least a nickel filler.

The pre-coated metal sheet of the present invention has a coating film (coating film A) making use of a specific base resin. Hence, where this is made into a drive case with the coating film inside, the coating film may less deform if any contact member such as the optical disk has come into contact with the coating film, so that the area of contact between the coating film and any contact member such as the optical disk can be smaller and the disk scratch-preventive properties can be improved.

The pre-coated metal sheet of the present invention has a coating film (coating film A) making use of resin beads having an appropriate hardness and providing an appropriate sliding property. Also, the coating film has an arithmetical mean deviation of the assessed profile Ra and a mean width of the profile elements, RSm, which have been set within the stated ranges (Ra: 0.3 to 4.5 μm; RSm: 105 to 280 μm, and the ratio of mean particle diameter of the resin beads to coating film layer thickness has been set within the stated range (2.0 to 3.0). This can make the resin beads less come off while keeping small the area of contact between the coating film and any contact member such as the optical disk, and hence can make the contact member not easily scratched. Besides, the coating film surface has such an appropriate unevenness, and hence, if, e.g., any foreign matter such as dust, specks or waste thread has adhered to the coating film surface, it can hide in dales of the unevenness and, if adhered to hills thereof, can move to the dales, thus it does not come into contact with the optical disk to make the latter not easily scratched. Moreover, the coating film surface has such an appropriate unevenness to improve sliding property against the contact member at its edge face, and hence the rubbing noise can be small. Furthermore, the pre-coated metal sheet of the present invention is suited for retaining press oil at the time of press molding, and hence the coating film can not easily be scratched also during the press molding.

The pre-coated metal sheet of the present invention has a coating film (coating film A) also making use of a lubricant having a melting point sufficiently lower than the baking temperature, and hence it can have no non-uniformity in the sliding property. Because of the use of a specific lubricant, the pre-coated metal sheet has an appropriate sliding property, and can also enjoy a good wind-up performance when it is coiled up during manufacture.

The pre-coated metal sheet of the present invention may further have the stated conductive resin coating B on the side opposite to the coating film A, and hence the outer surface of the drive case can electromagnetically be shielded or can be grounded. In addition, in other embodiment, the pre-coated metal sheet may have, on the side opposite to the coating film A, the coating film C, which has a stated electrical resistance and a drive case surface temperature. Hence, the outer surface of the drive case can electromagnetically be shielded or can be grounded, and also the heat that may be accumulated in the interior of the drive case can be in a smaller quantity.

DESCRIPTION OF THE PREFERRED EMBODIMENTS

The present invention is described below in detail by giving preferred embodiments.

The pre-coated metal sheet of the present invention consists basically of a metal sheet, chemical conversion coatings formed on both sides of the metal sheet, a coating film A formed on one of the chemical conversion coatings optionally via an undercoat layer, and preferably a conductive resin coating B or a heat radiating & electrically conductive resin coating C formed on the other of the chemical conversion coatings.

A. Metal Sheet

There are no particular limitations on the metal sheet used in the present invention, as long as it has the strength high enough to form drive cases for component parts of electric equipment and electronic equipment and also has a sufficient workability for press molding. It may preferably be a sheet made of pure aluminum, an aluminum alloy such as a JIS 5000 type aluminum alloy, a zinc-coated steel sheet or a stainless steel sheet, any of which may typically have a thickness of from 0.1 mm to 2.0 mm.

B. Chemical Conversion Coatings

There are no particular limitations on the chemical conversion coatings as long as they are present between the surfaces of the metal sheet and the resin coating, and secure a high adherence between the both of these. For example, in the case of the aluminum alloy sheet, usable are chemical conversion coatings formed by using a phosphoric acid chromating solution, which is inexpensive and can be managed with ease, or chemical conversion coatings formed by coating type zirconium treatment, which may cause no change in treating solution components and requires no washing with water. Such chemical conversion is carried out by spraying a stated chemical conversion solution on the aluminum alloy sheet, or immersing the aluminum alloy sheet in the chemical conversion solution at a stated temperature for a stated time. In the case of the zinc-coated steel sheet or stainless steel sheet, chemical conversion coatings formed by, besides the chromating, using a phosphate treating solution.

Before the chemical conversion is carried out, the metal sheet may preferably be subjected to acid treatment (washing) with sulfuric acid, nitric acid, phosphoric acid or the like or alkali treatment (washing) with sodium hydroxide, sodium phosphate, sodium silicate or the like in order to remove any dirt from the surface of the metal sheet or control its surface texture. Such surface treatment by washing is also carried out by spraying a stated treating solution on the metal sheet, or immersing the metal sheet in the treating solution at a stated temperature for a stated time.

C. Coating Film A

Next, the coating film A is formed on one of the chemical conversion coatings. The coating film A may be formed by bake coating making use of a coating material prepared by incorporating a base resin (such as a polyester-series resin), specific resin beads and a specific lubricant as essential components and dissolving or dispersing these in a suitable solvent. Meanwhile, the coating film A may also be formed by powder coating of a mixture of the specific base resin, resin beads and lubricant without use of any solvent.

The coating film A thus formed is characterized in that its arithmetical mean deviation of the assessed profile Ra and mean width of the profile elements RSm, which are indexes of surface roughness, and the ratio of mean particle diameter of the resin beads to coating film layer thickness are set within the stated ranges. The mean width of profile elements, RSm, is an arithmetic mean value.

C-1. Surface Roughness

In regard to the surface roughness of the coating film A, it is so specified that Ra is from 0.3 to 4.5 μm and RSm is from 105 to 280 μm. As shown diagrammatically in FIG. 1, the surface roughness R of the coating film A is expressed as the height of protrusions (hills) formed by the resin beads, from a coating film surface where the resin beads are not present (i.e., the difference in height of unevenness of the coating film surface). As also shown diagrammatically in FIG. 1, spacing distance RS of profile elements represents the distance between the protrusions (hills) formed by the resin beads. Measured values of Ra and RSm are values found according to JIS B 0601. These values also include the scattering or the like of layer thickness, but depend chiefly on the layer thickness, the amount of the resin beads to be added and the particle diameter of the resin beads. Therefore, Ra may be regarded as the mean value of R, and RSm as the mean value of RS. Setting Ra and RSm within the above ranges enables the coating film A to have good disk scratch-preventive properties and the rubbing noise to be small.

If Ra is less than 0.3 μm, the height of the protrusions (hills) formed by the resin beads is so small that the area of contact between the coating film surface and the contact member optical disk on the inner surface of the drive case can not partly be made small to tend to make the optical disk scratched. If on the other hand Ra is more than 4.5 μm, the height of the protrusions (hills) formed by the resin beads is so large that the resistance produced when they rub the optical disk at its edge face may be so high as to make a large rubbing noise.

If RSm is less than 105 μm, because of a small distance between the protrusions (hills) formed by the resin beads, the area of contact between the coating film surface and the contact member optical disk is so large as to make the optical disk easily scratched. If on the other hand RSm is more than 280 μm, the distance between the protrusions (hills) formed by the resin beads is so large that the resistance produced when they rub the optical disk at its edge face may be so high as to make a large rubbing noise. More specifically, if the distance between the protrusions (hills) formed by the resin beads is large, the optical disk moves while its edge surface is kept in contact with a small number of protrusions (hills) formed by the resin beads, and hence the resistance in sliding comes high with respect to each protrusion (hill), also making a large rubbing noise. On the other hand, where the distance between the protrusions (hills) formed by the resin beads is small, the optical disk moves while its edge surface is kept in contact with a large number of protrusions (hills) formed by the resin beads, and hence the resistance in sliding at each protrusion (hill) comes low to enable the rubbing noise to be kept from coming.

The sliding property and the hardness may differ depending on the type of the resin beads a2, and hence the ranges may also differ in which preferable numerical values for Ra and RSm are to be specified.

Where the resin beads a2 are nylon-series resin beads, Ra may be from 3.0 to 4.5 µm, and RSm from 200 to 280 µm.

Where the resin beads a2 are fluorine-series resin beads, Ra may be from 0.3 to 0.6 µm, and RSm from 200 to 220 µm.

Where the resin beads a2 are urethane-series resin beads, Ra may be from 1.0 to 2.5 µm, and RSm from 105 to 250 µm.

In order to provide the coating film A with the surface physical properties consisting of the above Ra and RSm, the mean particle diameter of the resin beads a2 and the quantity in which they are to be added, the thickness of the coating film A, and so forth may appropriately be controlled.

Where urethane-series resin beads are used as the resin beads, Ra may be from 1.0 to 2.5 µm, RSm from 105 to 250 µm and further the relationship between Ra and RSm may satisfy the following equation (1). This can make the resin beads a2 elastically deform when the contact member comes into contact with the coating film, to bring out a cushioning effect of absorbing any impact caused by such contact and bring an improvement in sliding property by keeping appropriate area of contact between the coating film and the contact member. As a result, the disk scratch-preventive properties can be more improved.

$$200 \leq RSm + 73 \times Ra \leq 350 \quad (1)$$

Namely, an appropriative unevenness is formed on the coating film surface to keep appropriate area of contact between the coating film and the contact member, and hence can make the contact member not easily scratched. Where Ra as index of height of hills is small and RSm as index of distance of hills is small, namely, where the value of $RSm + 73 \times Ra$ is less than 200, hills have a small height and are closely distributed each other. Hence, when the contact member such as an optical disk is caused to contact with the coating film surface by forcing a load to the contact member, the contact member is slightly deformed and thus the number of hills of the coating film coming into contact with the contact member is increased. As a result, resistance in sliding on the coating film surface comes large and foreign substances can't easily hide in dales of the hills, and hence this can make the contact member easily scratched.

On the other hand, where Ra is large and RSm is large, namely, where the value of $RSm + 73 \times Ra$ is more than 350, hills have a large height and are sparsely distributed each other. Hence, when the contact member such as an optical disk is caused to contact with the coating film surface by forcing a load to the contact member, the contact member is slightly deformed and thus a load applied on individual hill is increased. As a result, resistance in sliding on the coating film surface comes large and hence this can make the contact member easily scratched as same as the case of the small height hill and close distribution thereof.

The resistance in sliding on the coating film surface can be controlled by selecting not-too small and large Ra and RSm within an appropriate ranges, even if a load more than 200 g is applied on the contact member. The present inventors have experimentally investigated the relationship between Ra and RSm where more control effect of sliding resistance is achieved and found that a noticeable effect is obtained in the case that the equation (1) is satisfied. When the equation (1) is satisfied, the disk scratch-preventive properties of the contact member can be more effectively eased by such an excellent control effect of sliding resistance.

C-2. Mean particle Diameter Pd of Resin Beads a2 with Respect to Thickness of Coating Film A As to the relationship between coating film A's thickness described later and resin beads a2's mean particle diameter Pd described later, the ratio of Pd to the coating film thickness is so specified as to be from 2.0 to 3.0. If the ratio of Pd to the coating film thickness is less than 2.0, the contact member such as the optical disk tends to come into contact with the coating film surface portion where the resin beads are not present, to tend to make the optical disk scratched. If on the other hand the ratio of Pd to the coating film thickness is more than 3.0, the resin beads tend to come off the coating film at the time of press molding to tend to make the optical disk scratched because of an insufficient number of the resin beads a2. Also, if this ratio is more than 3.0, the edge face of the contact member (optical disk) may be caught on the coating film surface, resulting in a high resistance in sliding, and also making a large rubbing noise.

C-3. How Resin Beads a2 Stand Distributed

In regard to how the resin beads a2 stand distributed at the surface of the coating film A, it is so specified that 4 or less agglomerates composed of 35 or more resin beads a2 may be present per 1 $mm^2$. How they stand distributed may be observed, e.g., on an optical microscope (100 magnifications). Where the resin beads a2 are present at the coating film surface in the state of being well dispersed, the area of contact with the optical disk can be made small to improve disk scratch-preventive properties. If on the other hand the resin beads a2 are present at the coating film surface in the state of being agglomerated, the area of contact with the optical disk is so large when the optical disk comes into contact with the coating film surface, that the optical disk may come scratched originating from such agglomerates. The present inventors have made extensive studies. As the result, they have ascertained that the disk scratch-preventive properties can be good as long as the number of resin beads in one agglomerate per 1 $mm^2$ is 34 or less. They have then ascertained that, even where the number of resin beads in one agglomerate per 1 $mm^2$ is 35 or more, the disk scratch-preventive properties is satisfied as long as the number of such agglomerates composed of 35 or more resin beads are 4 or less per 1 $mm^2$, and inferior disk scratch-preventive properties may result when the number of such agglomerates is 5 or more per 1 $mm^2$.

C-4. Coefficient of Dynamic Friction of Coating Film A

It is specified that the coating film A may have a coefficient of dynamic friction of 0.15 or less. If the coating film A has a coefficient of dynamic friction of more than 0.15, its surface may have an inferior lubricity to tend to make the coating film scratched at the time of press molding. The coating film A may preferably have a coefficient of dynamic friction of 0.03 or more. If it has a coefficient of dynamic friction of less than 0.03, it may have so high sliding property as to cause a difficulty when it is coiled up.

C-5. Coating Film Thickness β

The coating film A may preferably have a coating film thickness β of from 4 to 20 µm at its part where the resin beads are not present. If it has a thickness β of less than 4 µm, the resin beads tend to come off the coating film at the time of press molding to tend to make the optical disk scratched because of an insufficient number of the resin beads a2. If on the other hand it has a thickness β of more than 20 µm, the proportion of the difference in height of unevenness of the coating film surface to the coating film thickness β is so small that any microscopic foreign matter such as dust, specks or waste thread having adhered to the coating film surface tends to comes into contact with the optical disk to tend to make the optical disk scratched. Incidentally, inasmuch as there is an appropriate difference in height of unevenness at the coating film surface, any microscopic dust, specks, waste thread or the like having adhered to the coating film surface can hide in dales of the unevenness and, if adhered to hills thereof, can move to the dales, thus such foreign matter does not come into contact with the optical disk to make the latter not easily scratched.

C-6. Base Resin a1

As the base resin a1, at least one is selected from the group consisting of a polyester-series resin, an epoxy-series resin and an acrylic-series resin. That is, one or two or more of these resins is/are used. These resins can make the coating film less deform when the contact member such as the optical disk comes into contact with the coating film and can make small the area of contact between the coating film and the contact member such as the optical disk, to bring an improvement in disk scratch-preventive properties.

As the polyester-series resin, an alkyd resin, an unsaturated polyester resin, a modified alkyd resin and the like may be used. The alkyd resin is a resin having as a skeleton a condensation product formed of a polybasic acid such as phthalic anhydride and a polyhydric alcohol such as glycerol and having been modified with an fats and oils containing a fatty acid. It is classified into a short-oil alkyd resin, a medium-oil alkyd resin, a long-oil alkyd resin and an ultralong-oil alkyd resin, depending on the type and content of the oil or fat to be used. The unsaturated polyester resin is synthesized by esterifying an unsaturated polybasic acid or a saturated polybasic acid and a glycol. As the polybasic acid, phthalic anhydride, isophthalic acid, terephthalic acid and adipic acid may be used. As the glycol, propylene glycol may chiefly be used. As the modified alkyd resin, what has been modified with a polymerizable monomer such as a natural resin, a phenolic resin or styrene may be used.

As the epoxy-series resin, a bisphenol-A epoxy resin, an acryl-modified epoxy resin, a bisphenol-F epoxy resin and the like may be used.

As the acrylic-series resin, what is obtained by polymerizing one or two or more monomer(s) such as acrylic acid, methacrylic acid, methyl methacrylate and/or ethyl acrylate may be used.

It is preferable to use the polyester-series resin, which can not easily cause the coating film to crack at the time of working such as press molding, promises a good operability at the time of coating, and is also cost-advantageous.

C-7. Resin Beads a2

The coating film A is incorporated with the resin beads a2 so that the resin beads a2 may elastically deform when the optical disk comes into contact with the coating film A, to bring out a cushioning effect of absorbing any impact caused by such contact. This brings an improvement in disk scratch-preventive properties to the contact member such as the optical disk.

Such resin beads a2 make upward protrusions at the coating film surface, and hence can make smaller the area of contact between the contact member optical disk and the coating film surface than a case in which no resin beads are added. As the result, the coating film A is improved in its sliding property required when the optical disk comes into contact with the coating film surface, to enable improvement in the disk scratch-preventive properties to the optical disk. If, however, acrylic resin beads are added, which may provide a high hardness, the optical disk may be scratched to come into question. In contrast thereto, the incorporation of one or two or more resin beads selected from the group consisting of nylon-series resin beads and fluorine-series resin beads, having a rich lubricity, and urethane-series resin beads, having a rich flexibility, enables achievement of sufficient disk scratch-preventive properties.

As the urethane-series resin beads, usable are those obtained by polyaddition reaction of a diisocyanate with a glycol, those obtained by allowing a diamine to react with a bischloroformate of a glycol in the presence of a dehydrochlorinating agent, those obtained by the reaction of a diamine with ethylene carbonate, those obtained by converting a ω-aminoalcohol into a chloroformate or a carbamate and subjecting it to condensation, and those obtained by the reaction of a bisurethane with a diamine. Those obtained by polyaddition reaction of a diisocyanate with a glycol may chiefly be used. As the diisocyanate, tolylene diisocyanate (a mixture of 2,4- and 2,6-tolylene diisocyanates) may chiefly be used. As the glycol (a compound having hydroxyl groups), an ether type such as polyoxypropylene glycol or polyoxypropylene-polyoxyethylene glycol and a polyester type obtained by condensation of adipic acid with ethylene glycol may chiefly be used.

As the nylon-series resin beads, beads of 6-nylon, 6,6-nylon, 3-nylon, 4-nylon, 7-nylon, 11-nylon, 12-nylon, 6,10-nylon, 6,12-nylon or the like may be used. Of these resins, 6-nylon, 6,6-nylon and 6,10-nylon may preferably be used.

As the fluorine-series resin beads, beads of polytetrafluoroethylene (PTFE), a tetrafluoroethylene/perfluoroalkyl vinyl ether copolymer (PFA), a tetrafluoroethylene/hexafluoropropylene copolymer (PFP), polychlorotrifluoroethylene (PCTFE), an ethylene-tetrafluoroethylene copolymer (ETFE), an ethylene-chlorotrifluoroethylene copolymer (ECTFE), polyvinylidene fluoride (PVDF), polyvinyl fluoride (PVF), polytrifluorochloroethylene (PTFCE) or polydichlorodifluoroethylene (DCDFE) may be used. Of these resins, polytetrafluoroethylene (PTFE) may most preferably be used.

The fluorine-series resin used in the resin beads a2 is in the form of beads, and has a better dispersibility in the base resin than the fluorine resin powder added to what is disclosed in the aforesaid Patent Document 1. Hence, such beady fluorine-series resin has an advantage that the sliding property can not easily come non-uniform, compared with the powdery fluorine resin.

The resin beads a2 used may have a mean particle diameter Pd of from 5 to 40 μm. If the resin beads a2 have a mean particle diameter Pd of less than 5 μm, the area of contact with the optical disk can not be made small to tend to make the optical disk scratched. If on the other hand the resin beads a2 have a mean particle diameter Pd of more than 40 μm, a high resistance in sliding at the coating film surface may result to make a large rubbing noise.

The resin beads a2 may be in a content of from 3 to 20% by weight based on the weight of the base resin of the coating film A. If the resin beads a2 are in a content of less than 3% by weight, the contact member (optical disk) tends to come into contact with the coating film surface portion where the resin beads a2 are not present, to tend to make the optical disk scratched. If on the other hand the resin beads a2 are in a content of more than 20% by weight, the beads tend to come off the coating film at the time of press molding to tend to make the optical disk scratched because of an insufficient number of the resin beads a2.

C-8. Lubricant a3

The coating film A further contains a lubricant a3. As the lubricant a3, one or two or more selected from the group consisting of carnauba wax, polyethylene wax and microcrystalline wax is/are used. The carnauba wax is a vegetable wax composed chiefly of a higher fatty ester, and has a melting point of from 78 to 86° C. As the polyethylene wax, one having a molecular weight of from 600 to 12,000 and a melting point of from 70 to 140° C. may be used. The microcrystalline wax is a crystalline wax consisting of fine crystals which is obtained from petroleum components, and what may be used is, e.g., one having a molecular weight of from 600 to 900 and a melting point of from 60 to 100° C.

These lubricants a3 provide the coating film surface with lubricity at the time of forming such as press molding to improve scratch resistance of the coating film, and, in addition thereto, have the action to provide the coating film surface with lubricity also after the pre-coated metal sheet has been worked by press molding, to make frictional force less produced between the optical disk and the coating film surface. These lubricants a3 are more inexpensive than lubricity-providing agents such as fluorine resin powder, and hence material cost can be reduced.

In addition, while the fluorine resin powder stands not liquefied at baking temperature (commonly from 200° C. or more to 300° C. or less), these lubricants are liquid in such a temperature range. Thus, the fluorine resin powder is not sufficiently penetrative into the base resin, and hence can not uniformly microscopically be distributed throughout the whole coating film to consequently make the sliding property come non-uniform. In contrast thereto, these lubricants used in the present invention is well penetrative into the base resin, and hence can uniformly microscopically be distributed throughout the whole coating film to therefore achieve sliding property without any non-uniformity over the whole coating film.

The lubricant a3 may be in a content of from 0.2 to 10% by weight, and preferably from 0.2 to 3% by weight, based on the weight of the base resin a1. If it is in a content of less than 0.2% by weight, the coating film surface can not be provided with sufficient lubricity, so that the coating film tends to be scratched at the time of press molding and also the optical disk tends to be scratched. If the lubricant a3 is in a content of more than 10% by weight, the pre-coated metal sheet may slip when it is coiled up during its manufacture, to make its wind-up difficult.

C-9. Additives

To the coating material used to form the coating film A in the present invention, a pigment, a pigment dispersant, a flowability modifier, a leveling agent, an anti-popping agent, an anticeptic, a stabilizer and so forth may be added which are used in usual coating materials in order to secure coating properties and common performance required as pre-coating materials.

C-10. Coating Film Formation

A coating material prepared by using the base resin a1, the resin beads a2 and the lubricant a3 as essential components, adding thereto the above additives properly and dissolving or dispersing these in a suitable solvent may directly be coated on one of the chemical conversion coatings (or on an undercoat layer in a case in which the undercoat layer detailed later is present) by means of a roll coater, followed by treatment for a stated time in an oven kept at a stated temperature, to carry out baking and drying. As the solvent, usable are benzene, toluene, methyl alcohol, ethyl alcohol, ethyl acetate, butyl acetate, cellosolve, butyl cellosolve, 1,4-dioxane, tetrahydrofuran, cyclohexane, isophorone, isobutyl alcohol, xylene, ethylbenzene, methyl ethyl ketone, diacetone alcohol and ethylene glycol monobutyl ether. The coating material may also be coated by means of an air sprayer, a bar coater of the like in place of the roll coater.

D. Undercoat Layer

Between the chemical conversion coating on which the coating film A is to be formed and the coating film A, an undercoat layer may be provided which is to improve adherence of the both. There are no particular limitations on such an undercoat layer as long as it affords a good adherence between the chemical conversion coating and the coating film A and also has a good press molding workability. For example, an undercoat layer may be used which is formed by bake coating making use of a coating material containing a resin having a good compatibility with the base resin a1 constituting the coating film A. As the resin for the undercoat layer, it is preferable to use the same resin as that for the base resin a1 of the coating film A. The undercoat layer may have a layer thickness of from 3 to 15 μm, and preferably from 5 to 10 μm.

The undercoat layer may be constituted of a plurality of layers, or other coating film consisting of a single layer or a plurality of layers may also be provided between the undercoat layer and the coating film A.

Such an undercoat layer may be formed by coating the coating material directly on the chemical conversion coating by means of a roll coater, an air sprayer, a bar coater or the like, followed by treatment for a stated time in an oven kept at a stated temperature, to carry out baking and drying.

E. Conductive Resin Coating B

The pre-coated metal sheet may be so made up as to be further provided with a conductive resin coating B on the outer surface on the side opposite to the coating film A, which is the surface that forms the outer surface of the drive case after press molding and is basically composed of a base resin b1, a nickel filler b2 and a lubricant b3. In this case, the other of the chemical conversion coatings is provided on the metal sheet on its side that forms the outer surface which is on the side opposite to the coating film A, and the conductive resin coating B is formed thereon. As the conductive resin coating B, a coating film may be used which is formed by coating a coating material prepared by mixing a nickel filler and a wax in an organic resin, as disclosed in Japanese Patent Application Laid-open No. 2001-29885.

E-1. Layer Thickness

The conductive resin coating B may have a thickness of from 0.2 to 2.0 μm. If it has a thickness of less than 0.2 μm, it may have a good electrical conductivity but may have poor corrosion resistance and press molding suitability. If it has a thickness of more than 2.0 μm, the nickel filler may come less exposed to the surface, resulting in a poor electrical conductivity.

E-2. Base Resin b1

As the base resin b1 used in the conductive resin coating B, one or two or more of resin(s) selected from the group consisting of a polyester-series resin, an acrylic-series resin and an epoxy-series resin is/are used. As the polyester-series resin, an alkyd resin, an unsaturated polyester resin, a modified alkyd resin and the like may be used. As the acrylic-series resin, what is obtained by polymerizing one or two or more monomer(s) such as acrylic acid, methacrylic acid, methyl methacrylate and/or ethyl acrylate may be used. As the epoxy-series resin, a bisphenol-A epoxy resin, an acryl-modified epoxy resin, a bisphenol-F epoxy resin and the like may be used.

E-3. Nickel Filler b2

The nickel (Ni) filler used in the conductive resin coating B makes use of a scaly nickel filler and a chainlike nickel filler. The "scaly" refers to the shape of flat pieces, and the "chainlike" refers to the shape made by mutual joining (chainlike or beady joining) of fine nickel particles to link slenderly like filaments. The use of these nickel fillers in the form of a mixture enables achievement of both the electrical conductivity and the press molding suitability.

Usually, press oil is used at the time of press molding. The pre-coated metal sheet can be press-molded without any problem in the case when the press oil is present as a lubricating film between the metal sheet and a press mold. If, however, the lubricating film runs dry locally, the surface of the pre-coated metal sheet comes scratched draggingly. The nickel filler also stands protrudent from the coating film surface, and hence, if the lubricating film runs dry, the nickel filler comes into contact with the press mold, so that the press-molded product may have a poor external appearance. That is, it is important to make the pre-coated metal sheet surface retain the press oil. The use of the above two types of nickel fillers in the form of a mixture enables the roughness of the coating film surface to be appropriately controlled to retain the press oil.

The scaly nickel filler and chainlike nickel filler may be mixed in a proportion of from 10 to 70% in total in weight ratio based on the resin solid content. If they are in a proportion of less than 10%, the conductive resin coating B may have inferior electrical conductivity and press molding suitability. If they are in a proportion of more than 70%, the conductive resin coating B may have a good electrical conductivity but may have inferior press molding suitability, adherence and corrosion resistance.

E-4. Lubricant b3

As the lubricant b3 used in the conductive resin coating B, one or two or more of lubricant(s) selected from the group consisting of carnauba wax, polyethylene wax and microcrystalline wax is/are used. The carnauba wax is a vegetable wax composed chiefly of a higher fatty ester, and has a melting point of from 78 to 86° C. As the polyethylene wax, one having a molecular weight of from 600 to 12,000 and a melting point of from 70 to 140° C. may be used. The microcrystalline wax is a crystalline wax consisting of fine crystals which is obtained from petroleum components, and what may be used is, e.g., one having a molecular weight of from 600 to 900 and a melting point of from 60 to 100° C.

These lubricants b3 provide the coating film surface with lubricity at the time of forming such as press molding to improve scratch resistance of the coating film.

The lubricant b3 may be mixed in a proportion of from 1 to 5% in weight ratio based on the resin solid content. If it is less than 1%, the conductive resin coating B may have an inferior lubricity to tend to make the coating film A scratched. If it is more than 5%, the conductive resin coating B may have too good lubricity, and hence the pre-coated metal sheet may slip to come into off-coil when wound up, to come not able to be coiled up.

E-5. Additives

To the coating material used to form the conductive resin coating B in the present invention, a leveling agent, an antipopping agent, a stabilizer, an anti-settling agent and so forth may be added which are used in usual coating materials in order to secure coating properties and common performance required as pre-coating materials.

E-6. Formation of Conductive Resin Coating B

A coating material prepared by using the base resin b1, the nickel filler b2 and the lubricant b3 as essential components, adding thereto the above additives properly and dissolving or dispersing these in a suitable solvent may directly be coated on the other of the chemical conversion coatings by means of a roll coater, followed by treatment for a stated time in an oven kept at a stated temperature, to carry out baking and drying. A top feed system is preferred in which a coating material fed from above to the part between a pick-up roll and an applicator roll is applied on the metal sheet by roll coating using the applicator roll. The coating material may directly be coated on the chemical conversion coating by means of an air sprayer, a bar coater of the like in place of the roll coater. As the solvent, the one exemplified in "C-10. Coating Film Formation" may be used.

E-7. Electrical Conductivity

The conductive resin coating B may have electrical conductivity which is so specified that the electrical resistance Er is 10Ω or less when a probe made of silver (a probe of 5 mm in diameter and having a tip of 2.5 mmR is used) is brought into touch with the coating surface at a load of 100 g by the four-terminal method. If Er is more than 10Ω, it is unable to sufficiently secure electrical properties such as grounding properties and magnetic-shielding properties necessary for the drive case outer surface.

F. Heat Radiating & Electrically Conductive Resin Coating C

The pre-coated metal sheet may be so made up as to be provided with a heat radiating and electrically conductive resin coating C in place of the conductive resin coating B, on the outer surface on the side opposite to the coating film A. In this case, the other of the chemical conversion coatings is provided on the metal sheet on its side that forms the outer surface which is on the side opposite to the coating film A, and a resin coating C is formed thereon which secures both heat radiation and electrical conductivity.

Such a heat radiating and electrically conductive resin coating C is formed using as a base resin c1 one or two or more resin(s) selected from the group consisting of a fluorine-series resin, an epoxy-series resin, a polyester-series resin, an acrylic-series resin and a urethane-series resin. It contains at least graphite in order to provide the coating with heat radiation and contains at least a nickel (Ni) filler in order to provide the coating with electrical conductivity. As the polyester-series resin, acrylic-series resin and epoxy-series resin serving as the base resin c1, the same resins as those exemplified for the base resin a1 used in the coating film A may be used. As the fluorine-series resin and urethane-series resin serving as the base resin c1, the same resins as those exemplified for the resin of the resin beads a2 used in the coating film A may be used.

The conductivity-providing component such as the nickel filler may be mixed in a proportion of from 10 to 70% in weight ratio based on the resin solid content. If it is less than 10%, the resin coating C may have inferior electrical conductivity and press molding suitability. If it is more than 70%, the resin coating C may have good electrical conductivity but may have inferior press molding suitability, adherence and corrosion resistance. As for the component of providing heat radiation, such as the graphite, it may be mixed in a proportion of from 20 to 100% in weight ratio based on the resin solid content. If it is less than 20%, the resin coating C may have inferior heat radiation. If it is more than 100%, the resin coating C may have good heat radiation but may have inferior press molding suitability.

Such a heat-dissipative and electrically conductive resin coating C may preferably be formed in a thickness of from 0.3 to 5 μm.

F. Heat Radiation and Electrical Conductivity

The heat radiating and electrically conductive resin coating C may have electrical conductivity which is so specified that the electrical resistance Er is 10Ω or less when a probe made of silver (a probe of 5 mm in diameter and having a tip of 2.5 mmR is used) is brought into touch with the coating surface at a load of 100 g by the four-terminal method. If Er is more than 10 Q, it is unable to sufficiently secure electrical properties such as grounding properties and magnetic-shielding properties necessary for the drive case outer surface.

As the heat radiation of the heat radiating and electrically conductive resin coating C, it is so specified that, when light is emitted and heat is generated in the state a light source is disposed in the interior of the drive case, the temperature of the drive case surface is 32° C. at a point of time where the temperature in the interior of the drive case has come into a steady state. If the drive case surface temperature is more than 32° C., the heat may become accumulated in the drive case to damage fundamental performance of electronic equipment.

As such a heat radiating and electrically conductive resin coating C, a coating film may be used which is formed by coating a coating material prepared by mixing the graphite and the nickel filler in an organic resin, as disclosed in Japanese Patent Application Laid-open No. 2005-305993.

The pre-coated metal sheet for slot-in drive cases which has been described above in detail is used for slot-in drive cases of electric equipment and electronic equipment such as television sets, videocassette recorders and personal computers, but without limitation to these. It may also be used for structural slot-in drive cases. The present pre-coated metal sheet has disk scratch-preventive properties to optical disks such as CDs (compact disks) and DVDs (digital video disks), but without limitation to such optical disks. It may also be used for scratch-preventive purposes for various members having precision-processed surfaces, such as magnetic optical disks.

EXAMPLES

The present invention is described below in greater details by giving Examples.

Examples 1 to 9

Aluminum alloy sheets were each used as the metal sheet. Each aluminum alloy sheet (material: JIS A5052; sheet thickness: 0.6 mm) was subjected on its both sides to degreasing with a commercially available degreaser for aluminum, followed by washing with water. Thereafter, the sheet thus treated was subjected on its both sides to chemical conversion with a commercially available phosphoric acid chromating solution. Next, one chemical conversion treated surface B each was coated with a coating material b shown in Table 1, by means of a bar coater, followed by baking. Meanwhile, the other chemical conversion treated surface A each was coated with an undercoat coating material composed of a polyester-series resin, followed by baking which was so controlled that the undercoat layer formed was in a thickness of 10 μm after baking. Next, on the undercoat layer thus formed, a coating material a containing the base resin, resin beads and lubricant shown in Table 1 was coated by means of a bar coater, followed by baking to prepare each sample. The baking of the coating material b, coating material a and undercoat coating material was carried out at a temperature of 230° C. as maximum ultimate sheet temperature (PMT). Preparation conditions of the samples of Examples 1 to 9 are shown in Table 1.

Comparative Examples 1 to 8

Samples of Comparative Examples 1 to 8 were prepared in the same manner as in Examples 1 to 9 but under preparation conditions shown in Table 2.

TABLE 1

| | | Coating material a | | | | | | | Coating material b | | | | | |
|---|---|---|---|---|---|---|---|---|---|---|---|---|---|---|
| | | | Resin beads a2 | | Lubricant | | | | | | | Lubricant | | |
| | | Base | | | Mean | a3 | | Coating | Base | Nickel | | b3 | | |
| | | resin | | Con- | particle | | Con- | film | resin | filler b2 | | | Con- | Coating |
| Example: | Metal sheet | a1 Type | Type | tent (wt. %) | diam. Pd (μm) | Type | tent (wt. %) | thickness β (μm) | Pd/β | b1 Type | SC (%)* | CL (%)* | Type | tent (%)* | film thickness |
| 1 | AlAL | PEst | Nylon | 5 | 30 | Crnb | 3 | 10 | 3.0 | PEst | 25 | 5 | PE | 3 | 1.0 |
| 2 | AlAL | PEst | Nylon | 20 | 30 | Crnb | 3 | 10 | 3.0 | Epoxy | 25 | 5 | Mccr | 3 | 1.0 |
| 3 | AlAL | PEst | Flrn | 5 | 10 | Crnb | 3 | 5 | 2.0 | Acrl | 25 | 5 | Crnb | 3 | 1.0 |
| 4 | AlAL | PEst | Flrn | 8 | 10 | Crnb | 3 | 5 | 2.0 | PEst + Epoxy | 25 | 5 | Mccr + PE | 3 | 1.0 |
| 5 | AlAL | PEst + Acrl | Urth + Nylon | 5 | 14 | Crnb + Mccr | 3 | 6 | 2.3 | PEst + Acrl | 25 | 5 | Mccr + Crnb | 3 | 1.0 |
| 6 | AlAL | PEst + Epoxy | Urth + Flrn | 5 | 14 | Crnb + PE | 3 | 6 | 2.3 | Epoxy | 17 | 3 | Mccr | 1 | 1.0 |
| 7 | AlAL | Acrl | Nylon + Flrn | 20 | 18 | Crnb | 3 | 7 | 2.6 | Epoxy | 18 | 2 | Mccr | 3 | 1.0 |
| 8 | AlAL | Acrl | Nylon + Flrn | 10 | 18 | Crnb | 3 | 7 | 2.6 | Epoxy | 19 | 1 | Mccr | 3 | 1.0 |
| 9 | AlAL | Acrl | Nylon + Flrn | 5 | 18 | Crnb | 3 | 7 | 2.6 | Epoxy | 16 | 4 | Mccr | 3 | 1.0 |

AlAL: Aluminum alloy; PEst: Polyester-series resin; Acrl: Acrylic-series resin; Epoxy: Epoxy-series resin Nylon: Nylon-series resin; Flrn: Fluorine-series resin; Urth: Urethane-series resin Crnb: Carnauba wax; Mccr: Microcrystalline wax; PE: Polyethylene wax *based on resin solid content; SC: Scaly shape; CL: Chainlike shape

TABLE 2

| Compara-tive example: | Metal sheet | Coating material a | | | | | | | | Coating material b | | | | | |
|---|---|---|---|---|---|---|---|---|---|---|---|---|---|---|---|
| | | Base resin a1 Type | Resin beads a2 | | | Lubricant a3 | | Coating film thickness β (μm) | Pd/β | Base resin b1 Type | Nickel filler b2 | | Lubricant b3 | | Coating film thickness |
| | | | Type | Content (wt. %) | Mean particle diam. Pd (μm) | Type | Content (wt. %) | | | | SC (%)* | CL (%)* | Type | Content (wt. %)* | |
| 1 | AlAL | Urth | Urth | 15 | 40 | PE | 3 | 20 | 2.0 | — | — | — | — | — | — |
| 2 | AlAL | Acrl | Acrl | 5 | 30 | PE | 3 | 15 | 2.0 | Acrl | — | — | PE | 3 | 1.0 |
| 3 | AlAL | Acrl | Nylon | 5 | 30 | PTFE | 3 | 15 | 2.0 | Acrl | 5 | 4 | PE | 3 | 1.0 |
| 4 | AlAL | Acrl | Nylon | 21 | 30 | PE | 3 | 10 | 3.0 | Acrl | 5 | 66 | PE | 3 | 1.0 |
| 5 | AlAL | Acrl | Flrn | 2 | 10 | PE | 3 | 5 | 2.0 | Acrl | 25 | 5 | Crnb | 3 | 0.1 |
| 6 | AlAL | Acrl | Nylon | 2 | 30 | PE | 3 | 10 | 3.0 | Acrl | 25 | 5 | Crnb | 3 | 2.1 |
| 7 | AlAL | Acrl | Nylon | 10 | 31 | PE | 3 | 10 | 3.1 | Epoxy | 3 | 3 | PE | 3 | 1.5 |
| 8 | AlAL | Acrl | Nylon | 10 | 19 | PE | 3 | 10 | 1.9 | Epoxy | 5 | 70 | Crnb | 3 | 1.5 |

AlAL: Aluminum alloy; Urth: Urethane-series resin; Acrl: Acrylic-series resin; Nylon: Nylon-series resin; Flrn: Fluorine-series resin; Epoxy: Epoxy-series resin PE: Polyethylene wax; PTFE: Polytetrafluoroethylene; Crnb: Carnauba wax *based on resin solid content; SC: Scaly shape; CL: Chainlike shape

Examples 14 and 15

In Example 14, a stainless steel sheet was used as the metal sheet. In Example 15, a zinc-coated steel sheet was used as the metal sheet. These metal sheets were subjected on their both sides to chemical conversion with a commercially available chromating solution. Next, one chemical conversion treated surface B each was coated with a heat-dissipative and electrically conductive resin coating material composed of a polyester-series resin, graphite and a nickel filler, by means of a bar coater so as to have a coating film thickness of 1 μm after drying, followed by baking. In this coating material, the graphite and the nickel filler were each in a content of 30% by weight and 40% by weight, respectively, based on the weight of the resin solid content.

Meanwhile, the other chemical conversion treated surface A each was coated with an undercoat coating material composed of a polyester-series resin, followed by baking which was so controlled that the undercoat layer formed was in a thickness of 10 μm after baking. Thereafter, on each undercoat layer thus formed, a coating material a containing the base resin, resin beads and lubricant shown in Table 3 was coated by means of a bar coater, followed by baking to prepare each sample. The baking of the coating material b, coating material a and undercoat coating material was carried out at a temperature of 230° C. as maximum ultimate sheet temperature (PMT). Preparation conditions of the samples of Examples 14 and 15 are shown in Table 3.

Figure 1:
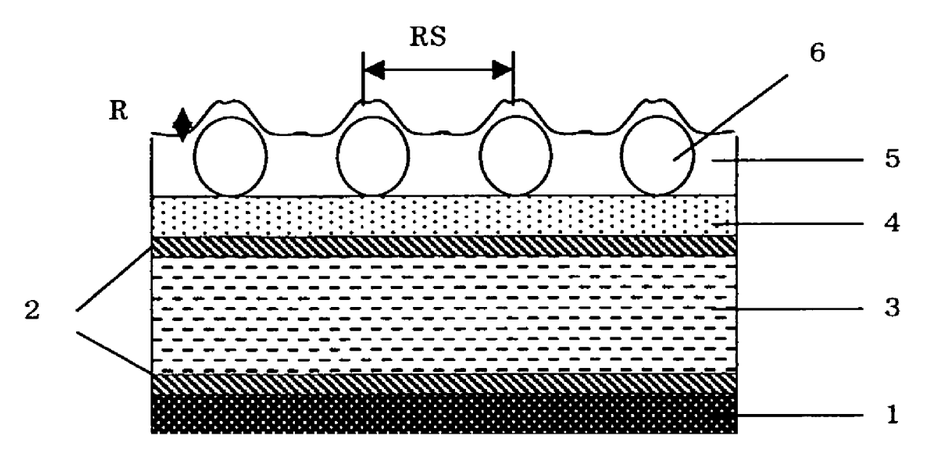
FIG. 1 is a sectional view of a pre-coated metal sheet for slot-in drive cases according to the present invention.

In the manner described above, pre-coated metal sheets for slot-in drive cases were prepared, which were each as shown diagrammatically in FIG. 1. In FIG. 1, reference numeral 1 denotes the conductive resin coating or the heat-dissipative and electrically conductive resin coating; 2, the chemical conversion coatings; 3, the metal sheet such as an aluminum alloy sheet; 4, the undercoat layer; 5, the coating film; and 6, the resin beads.

The chromium content of each chemical conversion coating was 30 mg/m² as measured with a fluorescent X-ray analyzer.

As to Examples 14 and 15, slot-in drive cases were produced in the following way, and the surface temperature of each drive case was measured. That is, with each pre-coated metal sheet B-surface outside and with each A-surface inside, a slot-in drive case was produced which was 150 mm×150 mm in bottom size and top size and 100 mm in height. A 60 W light bulb was disposed as a light source in the interior of the drive case, and light was emitted and heat was generated. The temperature of the drive case surface at a point of time where the temperature in the interior of the drive case came into a steady state was measured. As the result, the temperature in the steady state was 32° C.

Regarding the pre-coated metal sheets prepared in Examples 1 to 9, 14 and 15 and Comparative Examples 1 to 8, surface roughness, lubricity and the state of distribution of resin beads (how resin beads stood distributed) were measured in the following way, and disk scratch-preventive prop-

TABLE 3

| Example: | Metal sheet | Coating material a | | | | | | | |
|---|---|---|---|---|---|---|---|---|---|
| | | Base resin a1 Type | Resin beads a2 | | | Lubricant a3 | | Coating film thickness β (μm) | Pd/β |
| | | | Type | Content (wt. %) | Mean particle diam. Pd (μm) | Type | Content (wt. %) | | |
| 14 | Stainless steel | PEst | Nylon | 5 | 30 | Crnb | 3 | 10 | 3.0 |
| 15 | Zinc-coated steel | PEst | Nylon | 20 | 30 | Crnb | 3 | 10 | 3.0 |

PEst: Polyester-series resin; Nylon: Nylon-series resin; Crnb: Carnauba wax erties, rubbing noise proofness, flexibilty, electrical conductivity and corrosion resistance were evaluated in the following way. What was evaluated as "SA", "A" or "B" was judged to be of acceptance, and "C", rejection.

Surface Roughness:

At the A-surface of each pre-coated metal sheet, the arithmetical mean deviation of the assessed profile Ra and the mean width of the profile elements RSm were evaluated by the surface roughness measuring apparatus of feeler type.

Lubricity:

As the lubricity of the A-surface of each pre-coated metal sheet, the coefficient of dynamic friction was measured with a Bauden rubbing tester.

State of Distribution of Resin Beads:

The A-surface of each pre-coated metal sheet was observed on an optical microscope (100 magnifications), and how the resin beads stood distributed was evaluated by the number of agglomerates composed of 35 or more resin beads, per 1 mm$^2$.

Disk Scratch-preventive Properties:

Each pre-coated metal sheet was fastened onto a platen with the former's A-surface up, and an optical disk and a weight were further put on it, where the optical disk was horizontally slided thereon to measure the maximum load at which the optical disk does not come scratched.

SA: 200 g or more.
A: From 150 g or more to less than 200 g.
B: From 100 g or more to less than 150 g.
C: Less than 150 g.

Rubbing Noise Proofness:

Each pre-coated metal sheet was fastened onto a platen with the former's A-surface up, and any sound was evaluated which was made when on the sheet an optical disk was slided at its edge face and at a lean of 3 degrees.

A: Sound is slightly heard.
B: A small sound is heard.
C: A large sound is heard.

Flexibilty

The flexibilty was evaluated according to JIS Z 2248 by bending each pre-coated metal sheet at 180 degrees with its A-surface outside. Two unworked metal sheets (total thickness: 1.2 mm) were used as bend inserts. The external appearance of the bent portion was visually observed.

A: The coating film is not seen to have cracked.
C: The coating film is seen to have cracked.

Electrical Conductivity:

The electrical resistance Er was measured when a probe made of silver (a probe of 5 mm in diameter and having a tip of 2.5 mmR was used) was brought into touch with the B-surface of each pre-coated metal sheet by the four-terminal method.

A: 10Ω or less.
B: More than 10Ω.

Corrosion Resistance:

Cross cuts were made on the B-surface of each pre-coated metal sheet, and a salt spray test was conducted for 100 hours to visually observe the external appearance of the sheet.

A: No corrosion is seen.
C: Corrosion is seen.

The results of the above tests on Examples 1 to 9, 14 15 and Comparative Examples 1 to 8 are shown in Table 4.

TABLE 4

| | Properties of A-surface of pre-coated metal sheet | | | | | | | Properties of B-surface of pre-coated metal sheet | |
|---|---|---|---|---|---|---|---|---|---|
| | Surface roughness | | | State of distribution of resin beads | | | | | |
| | Arithmetical mean deviation of the assessed profile Ra (μm) | Mean width of profile elements RSm (μm) | Lubricity Coefficient of dynamic friction | Agglomerates of 35 or more resin beads per 1 mm$^2$ (number) | Disk scratch-preventive properties | Rubbing noise proofness | Flexi-bility | Electrical conductivity | Corrosion resistance |
| Example: | | | | | | | | | |
| 1 | 3.0 | 200 | 0.09 | 4 | B | B | A | A | A |
| 2 | 4.5 | 280 | 0.09 | 4 | B | B | A | A | A |
| 3 | 0.3 | 220 | 0.06 | 3 | A | A | A | A | A |
| 4 | 0.6 | 200 | 0.06 | 3 | A | A | A | A | A |
| 5 | 2.2 | 153 | 0.12 | 4 | B | B | A | A | A |
| 6 | 2.1 | 157 | 0.12 | 4 | B | B | A | A | A |
| 7 | 2.0 | 180 | 0.10 | 4 | A | A | A | A | A |
| 8 | 2.0 | 230 | 0.10 | 4 | B | B | A | A | A |
| 9 | 2.0 | 250 | 0.10 | 4 | B | B | A | A | A |
| 14 | 3.1 | 212 | 0.09 | 4 | B | B | A | A | A |
| 15 | 4.4 | 272 | 0.09 | 4 | B | B | A | A | A |
| Comparative Example: | | | | | | | | | |
| 1 | 4.5 | 280 | 0.15 | 4 | C | B | A | A | C |
| 2 | 3.3 | 215 | 0.15 | 4 | C | B | A | C | A |
| 3 | 3.4 | 214 | 0.11 | 4 | C | B | A | C | A |
| 4 | 4.6 | 240 | 0.11 | 4 | B | C | A | A | C |
| 5 | 0.2 | 250 | 0.06 | 3 | C | A | A | A | C |
| 6 | 1.4 | 281 | 0.11 | 3 | B | C | A | C | A |
| 7 | 3.5 | 220 | 0.11 | 4 | C | C | A | C | A |
| 8 | 2.0 | 260 | 0.10 | 4 | C | B | A | A | C |

The pre-coated metal sheets of Examples 1 to 9, 14, 15 each have on their A-surfaces the coating film A which is so made up that the resin beads a2 selected from the group consisting of nylon-series resin beads, fluorine-series resin beads and urethane-series resin beads and the lubricant a3 selected from the group consisting of carnauba wax, polyethylene wax and microcrystalline wax are added to the base resin a1 selected from the group consisting of a polyester-series resin, an epoxy-series resin and an acrylic-series resin, and has an arithmetical mean deviation of the assessed profile Ra of from 0.3 to 4.5 μm and a mean width of profile elements, RSm, of from 105 to 280 μm, where the ratio of mean particle diameter of the resin beads a2 to coating film layer thickness β of the coating film A is in the range of from 2.0 to 3.0. The results obtained when such coating films are used are shown in the table. In these pre-coated metal sheets, good disk scratch-preventive properties and rubbing noise proofness are achieved. In all Examples and Comparative Examples, the coating films are not seen to have broken, showing a good bending workability.

The pre-coated metal sheets of Examples 1 to 9 each have on their B-surfaces the conductive resin coating B which is a resin coating formed by coating a coating material which contains the base resin b1 selected from the group consisting of a polyester-series resin, an epoxy-series resin and an acrylic-series resin, the nickel filler b2 composed of a scaly nickel filler and a chainlike nickel filler, which is mixed in a content of from 10 to 70% based on the solid content, and the lubricant b3 selected from the group consisting of polyethylene wax, carnauba wax and microcrystalline wax, which is mixed in a content of from 1 to 5% in weight ratio based on the solid content; the conductive resin coating B having a thickness of from 0.2 to 2.0 μm as dried-coating film thickness. Hence, this coating B brings good corrosion resistance and electrical conductivity.

The pre-coated metal sheets of Examples 14 and 15 each have on their B-surfaces the heat-dissipative and electrically conductive resin coating C which contains a polyester-series resin as the base resin c1, graphite as the heat dissipating material c2 and a nickel filler as the conducting material c3. Hence, this coating C brings good corrosion resistance and electrical conductivity.

In Comparative Example 1, none of the polyester-series resin, the epoxy-series resin and the acrylic-series resin is used as the base resin a1 on the A-surface of the pre-coated metal sheet, and hence the pre-coated metal sheet has inferior disk scratch-preventive properties. Also, the B-surface of the pre-coated metal sheet is not covered with the conductive resin coating, and hence the pre-coated metal sheet has an inferior corrosion resistance.

In Comparative Example 2, none of nylon-series resin beads, fluorine-series resin beads and urethane-series resin beads are used as the resin beads a2 on the A-surface of the pre-coated metal sheet, and hence the pre-coated metal sheet has inferior disk scratch-preventive properties. Also, the nickel filler is not contained in the conductive resin coating on the B-surface side of the pre-coated metal sheet, and hence the pre-coated metal sheet has an inferior electrical conductivity.

In Comparative Example 3, none of carnauba wax, polyethylene wax and microcrystalline wax is used as the lubricant b3 on the A-surface of the pre-coated metal sheet, and hence the pre-coated metal sheet has inferior disk scratch-preventive properties. Also, the nickel filler in the conductive resin coating on the B-surface side of the pre-coated metal sheet is in a content of less than 10% based on the resin solid content, and hence the pre-coated metal sheet has an inferior electrical conductivity.

In Comparative Example 4, the A-surface of the pre-coated metal sheet has an arithmetical mean deviation of the assessed profile Ra of more than 4.5 μm, and hence the pre-coated metal sheet has an inferior rubbing noise proofness. Also, in the conductive resin coating on the B-surface side of the pre-coated metal sheet, the nickel filler is in a content of more than 70% based on the resin solid content, and hence the pre-coated metal sheet has an inferior corrosion resistance.

In Comparative Example 5, the A-surface of the pre-coated metal sheet has an arithmetical mean deviation of the assesses profile Ra of less than 0.3 μm, and hence the pre-coated metal sheet has inferior disk scratch-preventive properties. Also, the conductive resin coating on the B-surface side of the pre-coated metal sheet has a thickness of less than 0.2 μm, and hence the pre-coated metal sheet has an inferior corrosion resistance.

In Comparative Example 6, the A-surface of the pre-coated metal sheet has a mean width of the profile elements, RSm, of more than 280 μm, and hence the pre-coated metal sheet has an inferior rubbing noise proofness. Also, the conductive resin coating on the B-surface side of the pre-coated metal sheet has a thickness of more than 2.0 μm, and hence the pre-coated metal sheet has an inferior electrical conductivity.

In Comparative Example 7, the ratio of mean particle diameter of the resin beads to layer thickness of the coating film on the A-surface side of the pre-coated metal sheet is more than 3.0, and hence the pre-coated metal sheet has inferior disk scratch-preventive properties and rubbing noise proofness. Also, the nickel filler in the conductive resin coating on the B-surface side of the pre-coated metal sheet is in a content of less than 10% based on the resin solid content, and hence the pre-coated metal sheet has an inferior electrical conductivity.

In Comparative Example 8, the ratio of mean particle diameter of the resin beads to layer thickness of the coating film on the A-surface side of the pre-coated metal sheet is less than 2.0, and hence the pre-coated metal sheet has inferior disk scratch-preventive properties. Also, the nickel filler in the conductive resin coating on the B-surface side of the pre-coated metal sheet is in a content of more than 70% based on the resin solid content, and hence the pre-coated metal sheet has an inferior corrosion resistance.

Examples 10 to 13, 16 to 28 and Comparative Example 9 to 19

Samples of Examples 10 to 13 and 16 to 28 were prepared and tested in the same manner as in Examples 1 to 9. Samples of Comparative Examples 9 to 19 were prepared and tested in the same manner as in Comparative Example 1 to 8. Preparation conditions of the samples of Examples 10 to 13, 16 to 28 and Comparative Examples 9 to 19 are shown in Table 5 and the results thereof are shown in Table 6.

TABLE 5

| | | Coating material a | | | | | | | Coating material b | | | | | |
|---|---|---|---|---|---|---|---|---|---|---|---|---|---|---|
| | | | Resin beads a2 | | Lubricant a3 | | | | | | | Lubricant b3 | | |
| | | Base resin | | Mean particle | | | Coating film | | Base resin | Nickel filler b2 | | | | Coating film |
| | Metal sheet | a1 Type | Type | Con-tent (wt. %) | diam. Pd (μm) | Type | Con-tent (wt. %) | thickness β (μm) | Pd/β | b1 Type | SC (%)* | CL (%)* | Type | Con-tent (%)* | thickness |
| Example: | | | | | | | | | | | | | | | |
| 10 | AlAL | PEst | Urth | 5 | 14 | Crnb | 3 | 6 | 2.3 | Epoxy | 60 | 10 | Mccr | 5 | 1.0 |
| 11 | AlAL | Acrl | Urth | 5 | 14 | Crnb | 3 | 6 | 2.3 | Epoxy | 7 | 3 | Mccr | 3 | 0.2 |
| 12 | AlAL | Epoxy | Urth | 5 | 14 | Crnb | 3 | 6 | 2.3 | Epoxy | 60 | 10 | Mccr | 3 | 2.0 |
| 13 | AlAL | PEst | Urth | 8 | 14 | Crnb | 3 | 6 | 2.3 | Epoxy | 30 | 10 | Mccr | 3 | 1.0 |
| 16 | AlAL | PEst | Urth | 4 | 14 | Crnb | 3 | 6 | 2.3 | Epoxy | 40 | 10 | PE | 3 | 1.0 |
| 17 | AlAL | PEst | Urth | 4 | 14 | Crnb | 3 | 5 | 2.8 | Epoxy | 45 | 10 | PE | 3 | 1.0 |
| 18 | AlAL | PEst | Urth | 6 | 14 | Crnb | 3 | 6 | 2.3 | Epoxy | 43 | 7 | Mccr | 3 | 1.0 |
| 19 | AlAL | PEst | Urth | 3 | 6 | Crnb | 3 | 3 | 2.0 | Epoxy | 33 | 7 | Mccr | 3 | 1.0 |
| 20 | AlAL | PEst | Urth | 4 | 14 | Crnb | 4 | 5 | 2.8 | Epoxy | 25 | 3 | Mccr | 2 | 1.0 |
| 21 | AlAL | PEst | Urth | 5 | 14 | Crnb | 4 | 5 | 2.8 | Epoxy | 25 | 3 | PE | 4 | 1.0 |
| 22 | AlAL | PEst | Urth | 3 | 20 | PE | 2 | 8 | 2.5 | Epoxy | 26 | 4 | Mccr | 2 | 0.8 |
| 23 | AlAL | PEst | Urth | 4 | 20 | PE | 2 | 8 | 2.5 | Epoxy | 26 | 5 | PE | 2 | 0.8 |
| 24 | AlAL | PEst | Urth | 10 | 14 | Crnb | 3 | 6 | 2.3 | Epoxy | 26 | 4 | Mccr | 2 | 0.6 |
| 25 | AlAL | PEst | Urth | 4 | 10 | Crnb | 3 | 4 | 2.5 | Epoxy | 26 | 5 | PE | 2 | 0.6 |
| 26 | AlAL | PEst | Urth | 12 | 14 | PE | 5 | 7 | 2.0 | Acrl | 25 | 3 | PE | 3 | 1.2 |
| 27 | AlAL | PEst | Urth | 4 | 20 | PE | 2 | 9 | 2.2 | Acrl | 25 | 3 | Mccr | 3 | 1.1 |
| 28 | AlAL | PEst | Urth | 3 | 14 | PE | 5 | 6 | 2.3 | PEst | 25 | 3 | PE | 3 | 1.1 |
| Comparative Example: | | | | | | | | | | | | | | | |
| 9 | AlAL | Acrl | Urth | 20 | 45 | PE | 4 | 20 | 2.3 | Epoxy | 70 | 5 | Crnb | 2 | 1.5 |
| 10 | AlAL | Acrl | Urth | 1 | 6 | PE | 4 | 3 | 2.0 | Epoxy | 80 | 5 | Crnb | 2 | 1.5 |
| 11 | AlAL | Acrl | Urth | 19 | 14 | PE | 2 | 5 | 2.8 | Acrl | 5 | 25 | PE | 3 | 2.4 |
| 12 | AlAL | Acrl | Urth | 20 | 6 | PE | 2 | 3 | 2.0 | PEst | 5 | 24 | PE | 3 | 2.5 |
| 13 | AlAL | Acrl | Urth | 20 | 14 | PE | 5 | 5 | 2.8 | Acrl | 6 | 23 | Mccr | 2 | 2.7 |
| 14 | AlAL | Epoxy | Urth | 2 | 3 | PE | 5 | 1 | 3.0 | PEst | 7 | 22 | Crnb | 2 | 2.6 |
| 15 | AlAL | Epoxy | Urth | 5 | 3 | PE | 4 | 1 | 3.0 | PEst | 5 | 24 | Crnb | 3 | 2.3 |
| 16 | AlAL | Acrl | Urth | 5 | 40 | PE | 5 | 20 | 2.0 | Acrl | 4 | 23 | PE | 4 | 2.2 |
| 17 | AlAL | Epoxy | Urth | 9 | 40 | PE | 5 | 20 | 2.0 | Acrl | 3 | 24 | PE | 4 | 3.2 |
| 18 | AlAL | Epoxy | Urth | 3 | 20 | PE | 4 | 7 | 2.9 | PEst | 4 | 25 | Mccr | 3 | 3.3 |
| 19 | AlAL | Epoxy | Urth | 3 | 10 | PE | 4 | 5 | 2.0 | PEst | 6 | 24 | PE | 4 | 3.1 |

AlAL: Aluminum alloy; PEst: Polyester-series resin; Acrl: Acrylic-series resin; Epoxy: Epoxy-series resin; Urth: Urethane-series resin Crnb: Carnauba wax; Mccr: Macrocrystalline wax; PE: Polyethylene wax *based on resin solid content; SC: Scaly shape; CL: Chainlike shape

TABLE 6

| | Properties of A-surface of pre-coated metal sheet | | | | | | | Properties of B-surface of pre-coated metal sheet | |
|---|---|---|---|---|---|---|---|---|---|
| | Surface roughness | | | | State of distribution of resin beads Agglomerates of 35 or more resin beads per 1 mm2 (number) | Disk scratch-preventive properties | Rubbing noise proofness | | |
| | Arithmetical mean deviation of the assessed profile Ra (μm) | Mean width of profile elements RSm (μm) | RSm + 73 × Ra | Lubricity Coefficient of dynamic friction | | | | Flexi-bility | Electrical conductivity | Corrosion resistance |
| Example: | | | | | | | | | | |
| 10 | 2.0 | 150 | 296 | 0.10 | 2 | SA | A | A | A | A |
| 11 | 2.2 | 170 | 331 | 0.14 | 3 | SA | B | A | A | A |
| 12 | 2.2 | 167 | 328 | 0.14 | 3 | SA | B | A | A | A |
| 13 | 2.5 | 180 | 363 | 0.12 | 3 | A | A | A | A | A |
| 16 | 1.2 | 250 | 338 | 0.11 | 3 | SA | A | A | A | A |
| 17 | 1.0 | 170 | 243 | 0.10 | 3 | SA | A | A | A | A |
| 18 | 2.3 | 182 | 350 | 0.10 | 3 | SA | A | A | A | A |
| 19 | 1.1 | 112 | 192 | 0.10 | 3 | A | A | A | A | A |
| 20 | 2.3 | 210 | 378 | 0.10 | 3 | A | A | A | A | A |
| 21 | 2.2 | 200 | 361 | 0.11 | 3 | A | A | A | A | A |
| 22 | 1.5 | 245 | 355 | 0.14 | 3 | B | B | A | A | A |
| 23 | 1.8 | 230 | 361 | 0.14 | 3 | B | B | A | A | A |
| 24 | 2.5 | 140 | 323 | 0.10 | 3 | SA | A | A | A | A |

TABLE 6-continued

Properties of A-surface of pre-coated metal sheet

| | Surface roughness | | | | State of distribution of resin beads Agglomerates of 35 or more resin | | | | Properties of B-surface of pre-coated metal sheet | |
|---|---|---|---|---|---|---|---|---|---|---|
| | Arithmetical mean deviation of the assessed profile Ra (μm) | Mean width of profile elements RSm (μm) | RSm + 73 × Ra | Lubricity Coefficient of dynamic friction | beads per 1 mm2 (number) | Disk scratch- preventive properties | Rubbing noise proofness | Flexi- bility | Electrical conductivity | Corrosion resistance |
| 25 | 1.1 | 120 | 200 | 0.11 | 3 | SA | A | A | A | A |
| 26 | 2.0 | 105 | 251 | 0.10 | 4 | SA | A | A | A | A |
| 27 | 1.7 | 224 | 348 | 0.14 | 2 | SA | B | A | A | A |
| 28 | 2.0 | 198 | 344 | 0.11 | 2 | SA | A | A | A | A |
| Compara- tive Example: | | | | | | | | | | |
| 9 | 4.8 | 60 | 410 | 0.14 | 4 | C | C | A | A | C |
| 10 | 0.2 | 290 | 305 | 0.14 | 2 | C | C | A | A | C |
| 11 | 2.2 | 98 | 259 | 0.11 | 4 | C | B | A | C | A |
| 12 | 1.4 | 95 | 197 | 0.10 | 4 | C | B | A | C | A |
| 13 | 2.4 | 96 | 271 | 0.11 | 4 | C | B | A | C | A |
| 14 | 0.2 | 232 | 247 | 0.08 | 1 | C | A | A | C | A |
| 15 | 0.2 | 151 | 166 | 0.08 | 2 | C | A | A | C | A |
| 16 | 4.8 | 233 | 583 | 0.15 | 2 | B | C | A | C | A |
| 17 | 4.9 | 154 | 512 | 0.15 | 2 | B | C | A | C | A |
| 18 | 2.3 | 293 | 461 | 0.14 | 2 | B | C | A | C | A |
| 19 | 1.3 | 287 | 382 | 0.11 | 2 | B | C | A | C | A |

The pre-coated metal sheets of Examples 10 to 13 and 16 to 28 each have on their A-surfaces the coating film A which is so made up that urethane-series resin beads and the lubricant a3 selected from the group consisting of carnauba wax, polyethylene wax and microcrystalline wax are added to the base resin a1 selected from the group consisting of a polyester-series resin, an epoxy-series resin and an acrylic-series resin, and has an arithmetical mean deviation of the assessed profile Ra of from 1.0 to 2.5 μm and a mean width of the profile elements, RSm, of from 105 to 250 μm, where the ratio of mean particle diameter of the resin beads a2 to coating film layer thickness p of the coating film A is in the range of from 2.0 to 3.0. The results obtained when such coating films are used are shown in the table. In these pre-coated metal sheets, good disk scratch-preventive properties, rubbing noise proofness and flexibility are achieved. In the pre-coated metal sheets of Example 10 to 12, 16 to 18 and 24 to 28, particularly good disk scratch-preventive properties are achieved, since Ra and RSm satisfy the relation of the above equation (1).

In Comparative Example 9, the A-surface of the pre-coated metal sheet has an arithmetical mean deviation of the assessed profile Ra of more than 2.5 μm, and a mean width of the profile elements, RSm, of less than 105 μm, hence the pre-coated metal sheet has inferior disk scratch-preventive properties and rubbing noise proofness. Also, in the conductive resin coating on the B-surface side of the pre-coated metal sheet, the nickel filler is in a content of more than 70% based on the resin solid content, and hence the pre-coated metal sheet has an inferior corrosion resistance.

In Comparative Example 10, the A-surface of the pre-coated metal sheet has an arithmetical mean deviation of the assessed profile Ra of less than 1.0 μm, and a mean width of the profile elements, RSm, of more than 250 μm, hence the pre-coated metal sheet has inferior disk scratch-preventive properties and rubbing noise proofness. Also, in the conductive resin coating on the B-surface side of the pre-coated metal sheet, the nickel filler is in a content of more than 70% based on the resin solid content, and hence the pre-coated metal sheet has an inferior corrosion resistance.

In Comparative Examples 11-13, the A-surface of the pre-coated metal sheet has a mean width of the profile elements, RSm, of less than 105 μm, and hence the pre-coated metal sheet has inferior disk scratch-preventive properties. Also, the conductive resin coating on the B-surface side of the pre-coated metal sheet has a thickness of more than 2.0 μm, and hence the pre-coated metal sheet has an inferior electrical conductivity.

In Comparative Examples 14 and 15, the A-surface of the pre-coated metal sheet has an arithmetical mean deviation of the assessed profile Ra of less than 1.0 μm, hence the pre-coated metal sheet has inferior disk scratch-preventive properties. Also, the conductive resin coating on the B-surface side of the pre-coated metal sheet has a thickness of more than 2.0 μm, and hence the pre-coated metal sheet has an inferior electrical conductivity.

In Comparative Examples 16 and 17, the A-surface of the pre-coated metal sheet has an arithmetical mean deviation of the assesses profile Ra of more than 2.5 μm, and hence the pre-coated metal sheet has an inferior rubbing noise proofness. Also, the conductive resin coating on the B-surface side of the pre-coated metal sheet has a thickness of more than 2.0 μm, and hence the pre-coated metal sheet has an inferior electrical conductivity.

In Comparative Examples 18 and 19, the A-surface of the pre-coated metal sheet has a mean width of the profile elements, RSm, of more than 250 μm, and hence the pre-coated metal sheet has an inferior rubbing noise proofness. Also, the conductive resin coating on the B-surface side of the pre-coated metal sheet has a thickness of more than 2.0 μm, and hence the pre-coated metal sheet has an inferior electrical conductivity.

POSSIBILITY OF INDUSTRIAL APPLICATION

To provide a pre-coated metal sheet which is a pre-coated metal sheet used for slot-in drive cases, and has superior scratch-preventive properties to optical disks, makes only a small rubbing noise, promises a good wind-up performance when it is coiled up, a superior productivity and a low production cost, and further is free of non-uniformity in sliding property.

What is claimed is:

1. A pre-coated metal sheet for being press molded into slot-in drive cases which comprises:
    a metal sheet;
    chemical conversion coatings formed on both sides of the metal sheet; and
    a coating film A which is a coating film formed on one of said chemical conversion coatings, and contains at least one base resin a1 selected from the group consisting of a polyester-series resin, an epoxy-series resin and an acrylic-series resin, at least one type of resin beads a2 selected from the group consisting of nylon-series resin beads, fluorine-series resin beads and urethane-series resin beads, and at least one lubricant a3 selected from the group consisting of carnauba wax, polyethylene wax and microcrystalline wax;
    said coating film A having a surface which has an arithmetical mean deviation of assessed profile Ra of from greater than 0.3 μm to less than or equal to 4.5 μm and a mean width of profile elements RSm, of from 105 to 280 μm, and a ratio of mean particle diameter of said resin beads a2 to coating film layer thickness of said coating film A being in a range of from 2.0 to 3.0 , whereby the coating film A has a disk scratch-preventive property when contacting an optical disk,
    wherein a number of agglomerates in a range of 2≦x≦4 and composed of 35 or more resin beads a2 are present in said coating film A per 1 mm² of its surface, and said coating film A has a coefficient of dynamic friction of 0.15 or less at its surface.

2. The pre-coated metal sheet for slot-in drive cases according to claim 1, wherein said resin beads a2 are the nylon-series resin beads, and said coating film A has a surface which has an arithmetical mean deviation of the assessed profile Ra of from 3.0 to 4.5μm and a width of the profile elements RSm, of from 200 to 280 μm.

3. The pre-coated metal sheet for slot-in drive cases according to claim 1, wherein said resin beads a2 are the fluorine-series resin beads, and said coating film A has a surface which has an arithmetical mean deviation of the assessed profile Ra of from greater than 0.3 μm to less than or equal to 0.6μm and a mean width of the profile elements RSm, of from 200 to 220 μm.

4. The pre-coated metal sheet for slot-in drive cases according to claim 1, wherein said resin beads a2 are the urethane-series resin beads, and said coating film A has a surface which has an arithmetical mean deviation of the assessed profile Ra of from 1.0 to 2.5μm and a mean width of the profile elements RSm, of from 105 to 250 μm.

5. The pre-coated metal sheet for slot-in drive cases according to claim 4, wherein Ra and RSm satisfy the relation of the following equation (1):

$$200 \leq RSm + 73 \times Ra \leq 350 \tag{1}.$$

6. The pre-coated metal sheet for slot-in drive cases according to claim 4, which further comprises a conductive resin coating B which is a resin coating formed on the other of said chemical conversion coatings and contains at least one base resin b1 selected from the group consisting of a polyester-series resin, an epoxy-series resin and an acrylic-series resin, a nickel filler b2 composed of a scaly shape and a chainlike shape, and at least one lubricant b3 selected from the group consisting of polyethylene wax, carnauba wax and microcrystalline wax;
    said filler b2 being in a content of from 10 to 70% by weight based on the solid content of said base resin b1, and said lubricant b3 being in a content of from 1 to 5% by weight based on the resin solid content; and
    said conductive resin coating B having a thickness of from 0.2 to 2.0μm.

7. The pre-coated metal sheet for slot-in drive cases according to claim 5, which further comprises a conductive resin coating B which is a resin coating formed on the other of said chemical conversion coatings and contains at least one base resin b1 selected from the group consisting of a polyester-series resin, an epoxy-series resin and an acrylic-series resin, a nickel filler b2 composed of a scaly shape and a chainlike shape, and at least one lubricant b3 selected from the group consisting of polyethylene wax, carnauba wax and microcrystalline wax;
    said filler b2 being in a content of from 10 to 70% by weight based on the solid content of said base resin b1, and said lubricant b3 being in a content of from 1 to 5% by weight based on the resin solid content; and
    said conductive resin coating B having a thickness of from 0.2 to 2.0μm.

8. The pre-coated metal sheet for slot-in drive cases according to claim 1, which further comprises a conductive resin coating B which is a resin coating formed on the other of said chemical conversion coatings and contains at least one base resin b1 selected from the group consisting of a polyester-series resin, an epoxy-series resin and an acrylic-series resin, a nickel filler b2 composed of a scaly shape and a chainlike shape, and at least one lubricant b3 selected from the group consisting of polyethylene wax, carnauba wax and microcrystalline wax;
    said filler b2 being in a content of from 10 to 70% by weight based on the solid content of said base resin b1, and said lubricant b3 being in a content of from 1 to 5% by weight based on the resin solid content; and
    said conductive resin coating B having a thickness of from 0.2 to 2.0μm.

9. The pre-coated metal sheet for slot-in drive cases according to claim 1, which further comprises a heat radiating and electrically conductive resin coating C which is a resin coating formed on the other of said chemical conversion coatings and contains at least one base resin c1 selected from the group consisting of a fluorine-series resin, an epoxy-series resin, a polyester-series resin, an acrylic-series resin and a urethane-series resin, a heat radiating material c2 containing at least graphite, and a conducting material c3 containing at least a nickel filler.

10. The pre-coated metal sheet for slot-in drive cases according to claim 4, which further comprises a heat radiating and electrically conductive resin coating C which is a resin coating formed on the other of said chemical conversion coatings and contains at least one base resin c1 selected from the group consisting of a fluorine-series resin, an epoxy-series resin, a polyester-series resin, an acrylic-series resin and a urethane-series resin, a heat radiating material c2 containing at least graphite, and a conducting material c3 containing at least a nickel filler.

11. The pre-coated metal sheet for slot-in drive cases according to claim 5, which further comprises a heat radiating and electrically conductive resin coating C which is a resin coating formed on the other of said chemical conversion coatings and contains at least one base resin c1 selected from the group consisting of a fluorine-series resin, an epoxy-series resin, a polyester-series resin, an acrylic-series resin and a urethane-series resin, a heat radiating material c2 containing at least graphite, and a conducting material c3 containing at least a nickel filler.

12. The pre-coated metal sheet for slot-in drive cases according to claim 1, wherein the coating film A is provided directly on said one of the chemical conversion coatings and an resin underlayer provided directly on said one of the chemical conversion coatings.

13. The pre-coated metal sheet for slot-in drive cases according to claim 12, wherein the resin underlayer includes said base resin a1 included in the coating film A.

14. A pre-coated metal sheet for being press molded into slot-in drive cases which comprises:

a metal sheet;

chemical conversion coatings formed on both sides of the metal sheet;

a coating film A which is a coating film formed on one of said chemical conversion coatings, and contains at least one base resin a1 selected from the group consisting of a polyester-series resin, an epoxy-series resin and an acrylic-series resin, at least one type of resin beads a2 selected from the group consisting of nylon-series resin beads, fluorine-series resin beads and urethane-series resin beads, and at least one lubricant a3 selected from the group consisting of carnauba wax, polyethylene wax and microcrystalline wax; and a conductive resin coating B which is a resin coating formed on the other of said chemical conversion coatings and contains at least one base resin b1 selected from the group consisting of a polyester-series resin, an epoxy-series resin and an acrylic-series resin, a nickel filler b2 composed of a scaly shape and a chainlike shape, and at least one lubricant b3 selected from the group consisting of polyethylene wax, carnauba wax and microcrystalline wax;

said coating film A having a surface which has an arithmetical mean deviation of assessed profile Ra of from greater than 0.3 μm to less than or equal to 4.5 μm and a mean width of profile elements RSm, of from 105 to 280μm, and a ratio of mean particle diameter of said resin beads a2 to coating film layer thickness of said coating film A being in a range of from 2.0 to 3.0, whereby the coating film A has a disk scratch-preventive property when contacting an optical disk;

said filler b2 being in a content of from 10 to 70 % by weight based on the solid content of said base resin b1, and said lubricant b3 being in a content of from 1 to 5 % by weight based on the resin solid content; and said conductive resin coating B having a thickness of from 0.2 to 2.0 μm.

* * * * *